Dec. 23, 1969  V. RAWLS  3,484,903
AUTOMATIC CLAMP BAND
Filed April 19, 1967  6 Sheets-Sheet 1
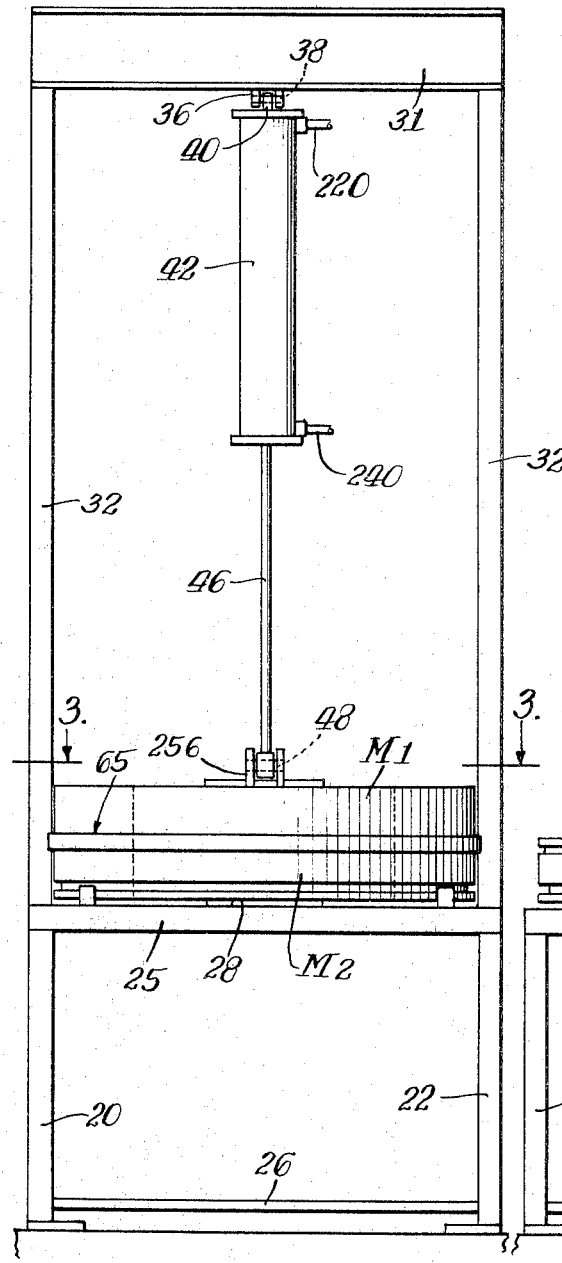
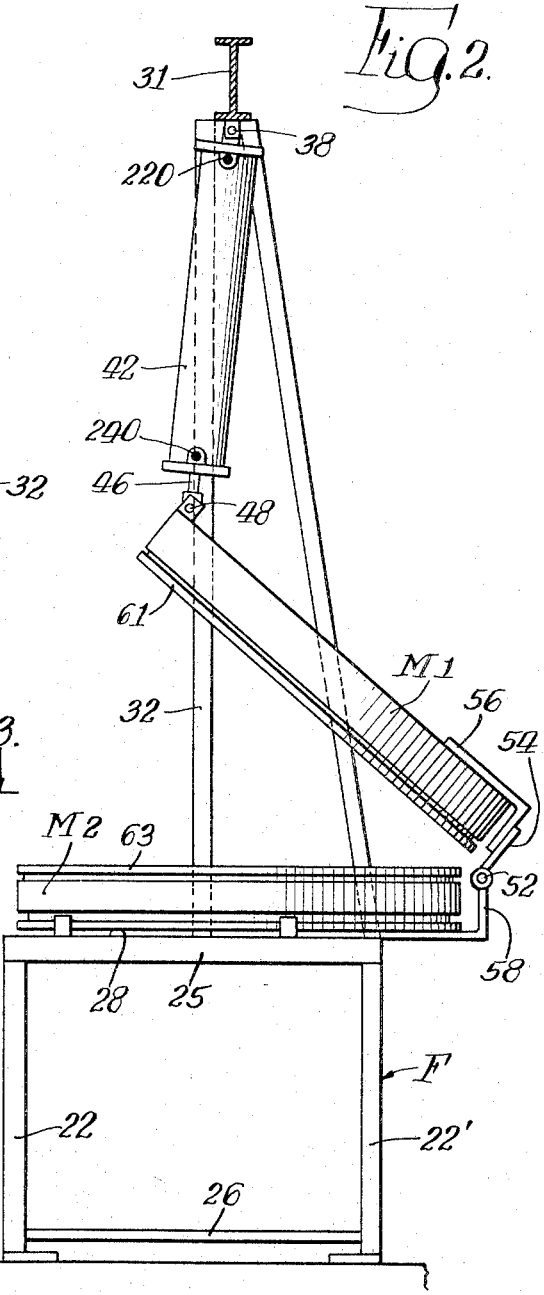
Inventor:—
Vaughn Rawls,

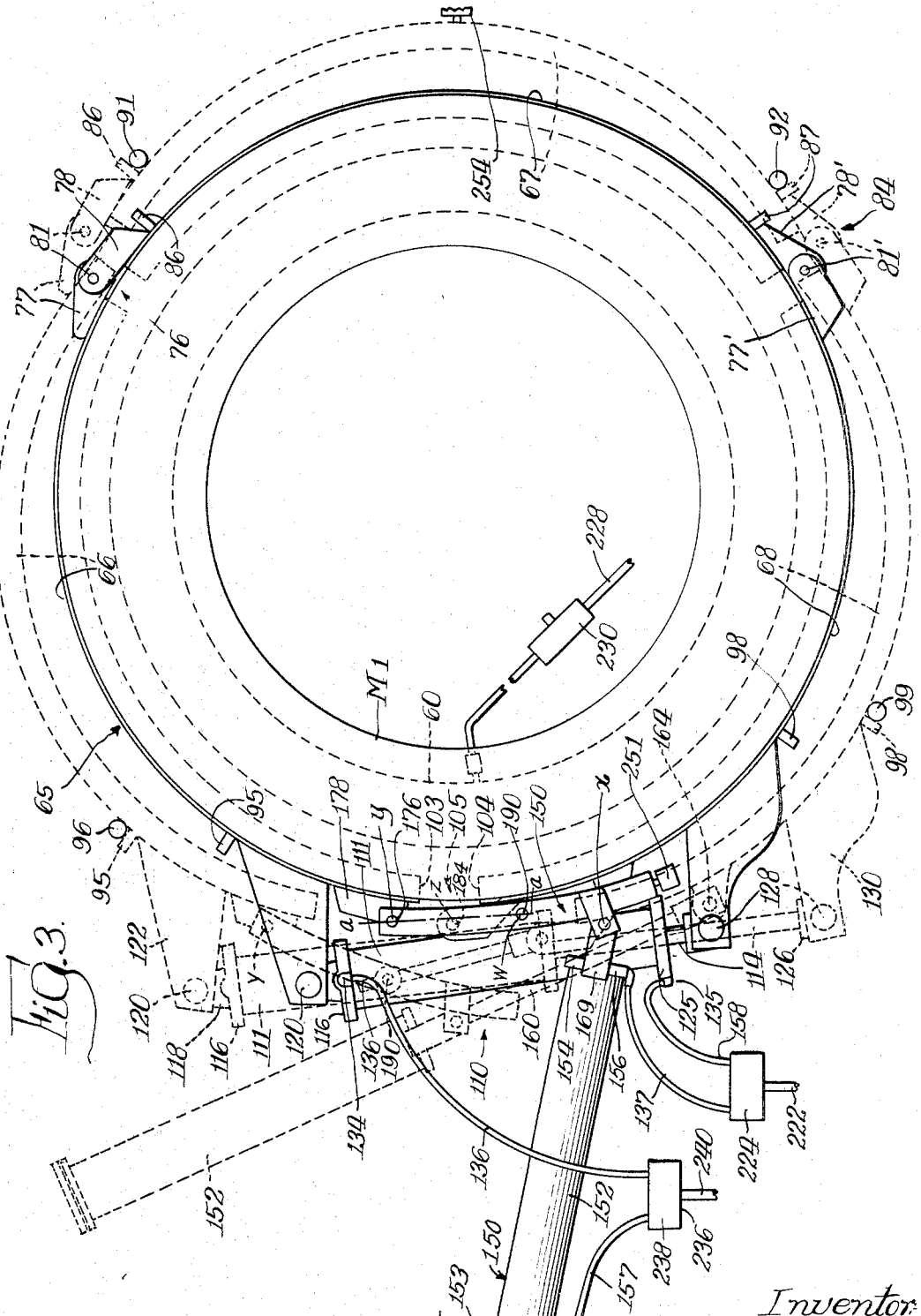

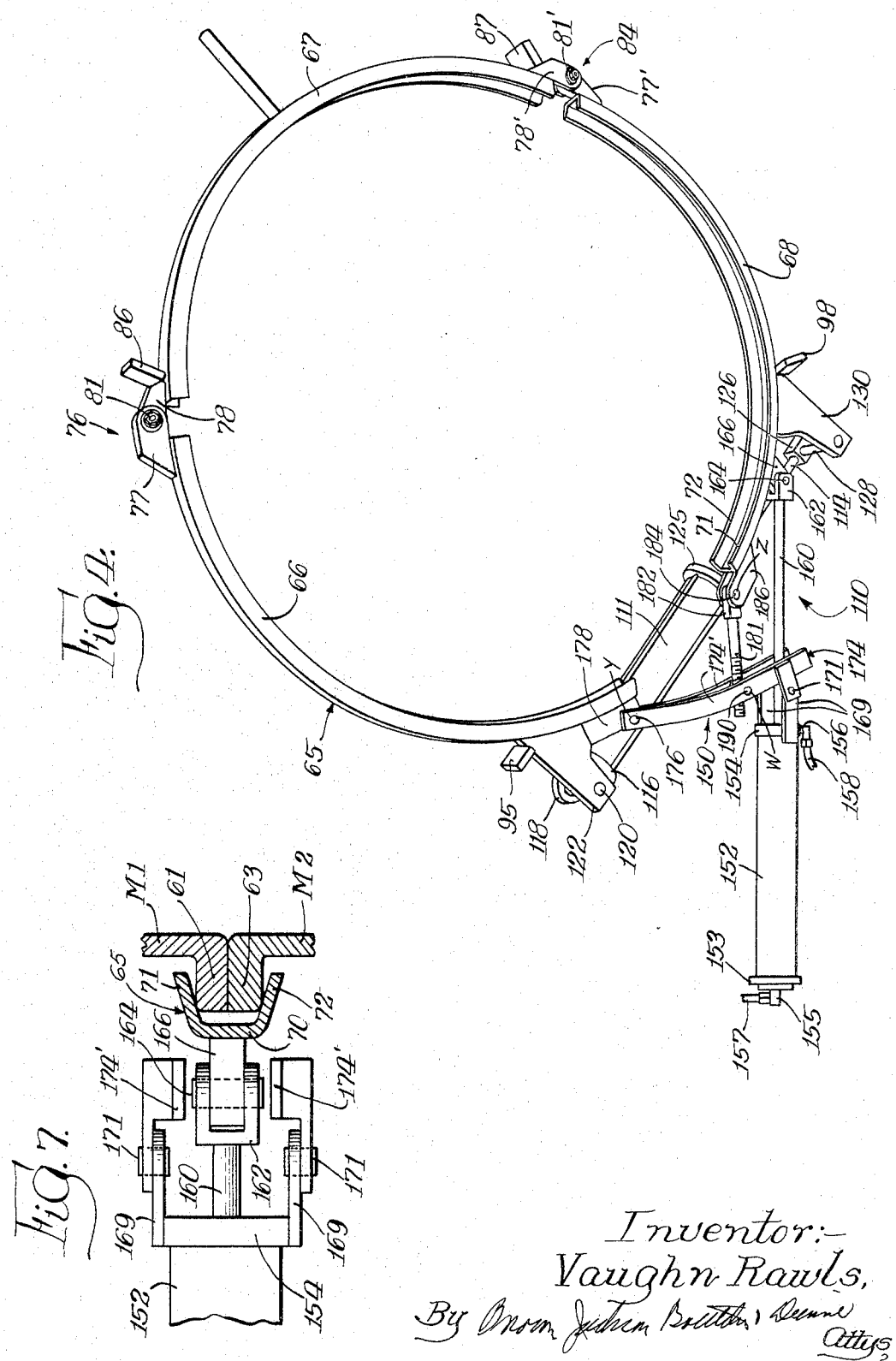

Dec. 23, 1969    V. RAWLS    3,484,903
AUTOMATIC CLAMP BAND
Filed April 19, 1967    6 Sheets-Sheet 4
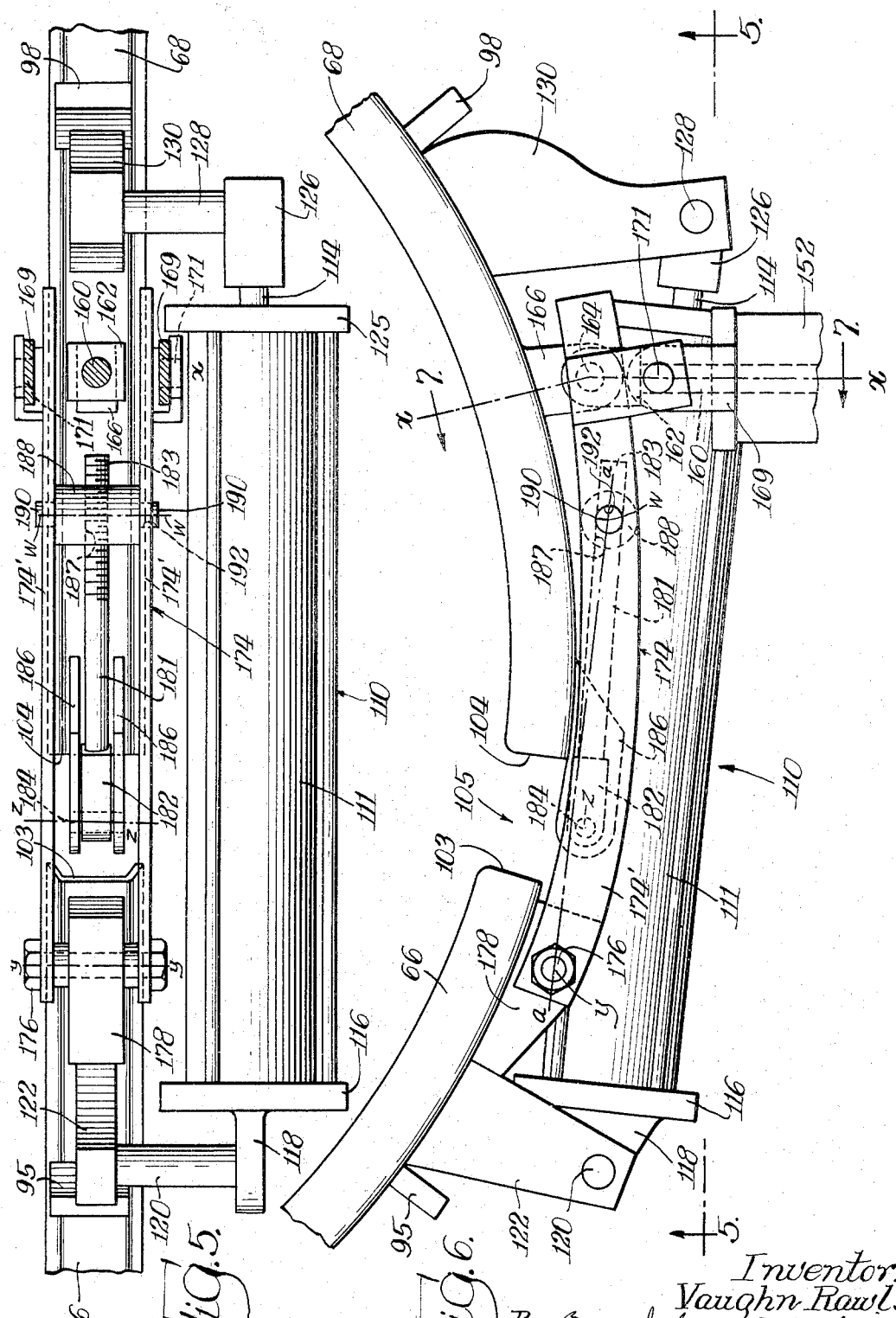
Inventor:-
Vaughn Rawls,
By
Attys.

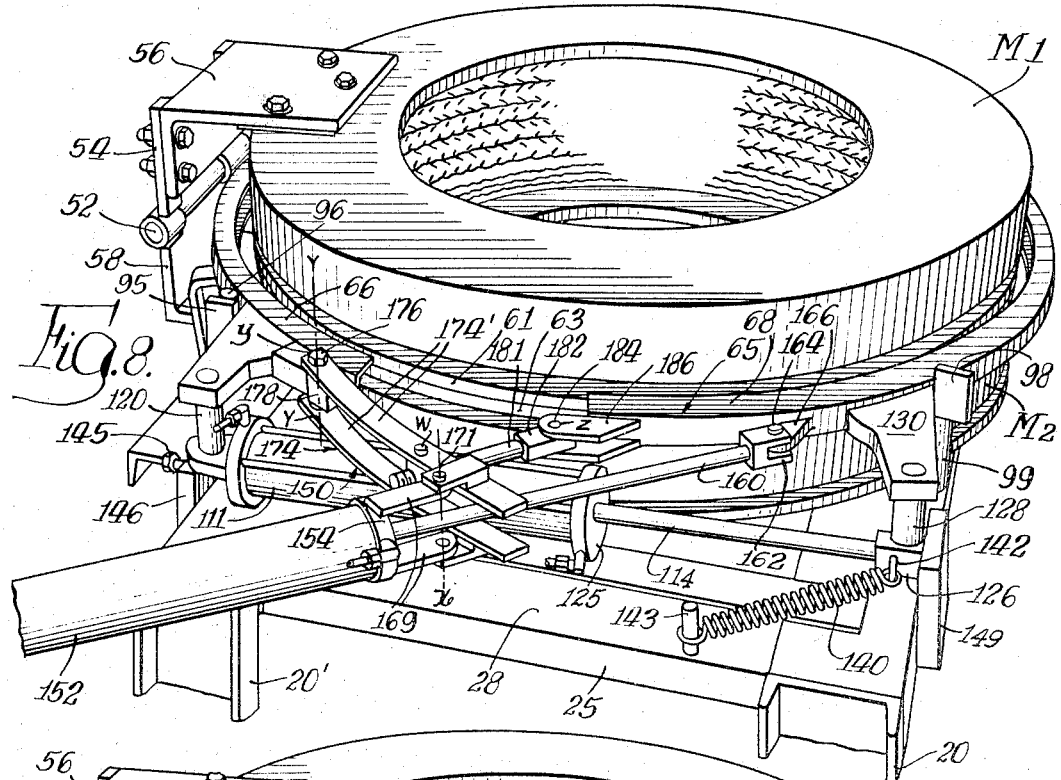
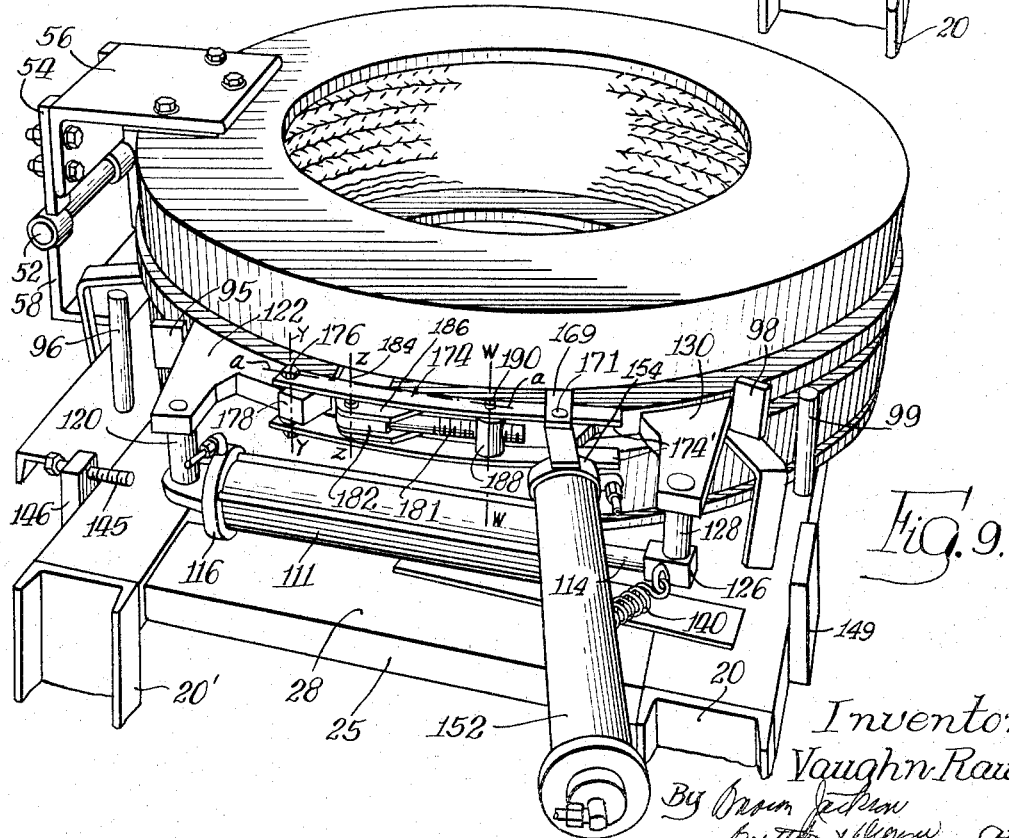

Dec. 23, 1969     V. RAWLS     3,484,903
AUTOMATIC CLAMP BAND
Filed April 19, 1967     6 Sheets-Sheet 6
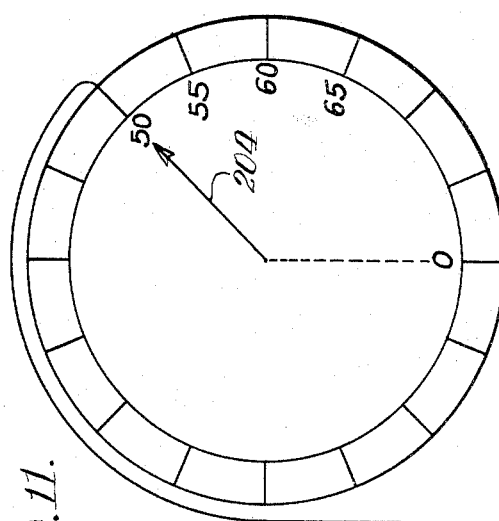
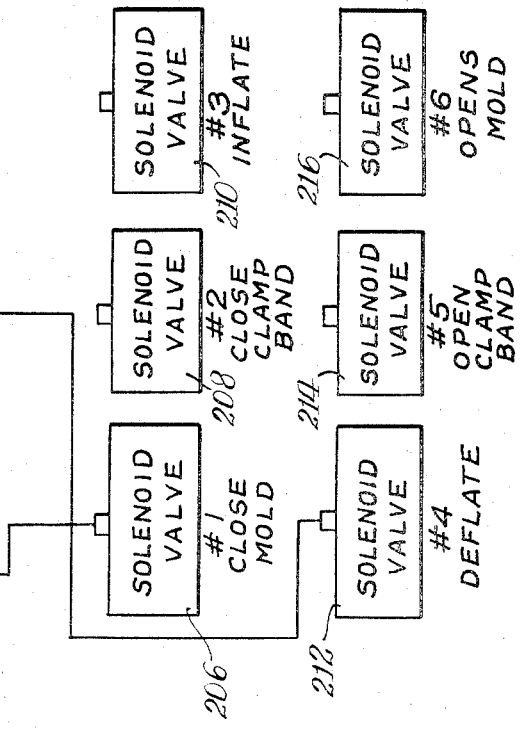
Fig.11.
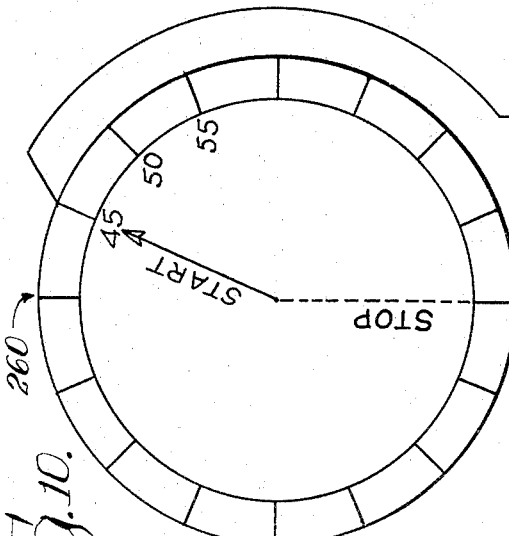
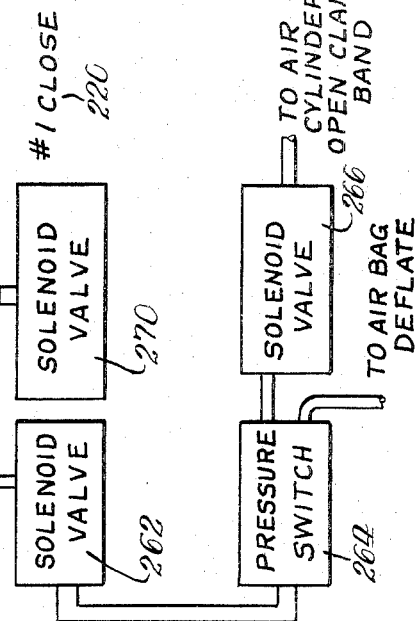
Fig.10.
INVENTOR.
Vaughn Rawls,
BY
ATTYS.

United States Patent Office 3,484,903
Patented Dec. 23, 1969

3,484,903
AUTOMATIC CLAMP BAND
Vaughn Rawls, Lima, Ohio, assignor, by mesne assignments, to National-Standard Company, Niles, Mich., a corporation of Delaware
Filed Apr. 19, 1967, Ser. No. 632,100
Int. Cl. B29h 5/02
U.S. Cl. 18—43                    3 Claims

ABSTRACT OF THE DISCLOSURE

Automatically operating clamping band for automatically clamping and unclamping the two halves of a tire forming mold; wherein one pneumatic power unit is provided for exerting a high pressure clamping tension on said band for locking the two mold halves together for forming the tire therebetween; and wherein another pneumatic power unit is provided for separating the ends of the clamping band to permit release thereof when the first pneumatic power unit unlocks the band. The first pneumatic power unit comprises a unique power multipling cam or toggle lever system for increasing the tension on the clamping band in the closing thereof. The operation of the system utilizes an electric timing and activating system which results in a more rapid and certain operation.

In the foregoing method of forming and curing tires between the two halves of a heated mold, an internal air bag is inserted within the tire carcass, and after the carass and air bag are clamped within the tire molds relatively high air pressures are introduced within this air bag for forcing the tire carcass outwardly against the tread forming inner walls of the two mold sections. Presence of these high air pressures within the bag is one of the reasons why the clamping band must be positive and certain in its operation of securing the two halves of the heated mold together.

An electrically operating automatic control system first controls the closing of the two mold sections after the tire carcass and the air bag have been inserted therebetween. The control system thereupon closes and locks the clamping band to securely lock the two mold sections together, whereupon the air pressure is introduced into the air bag. Thereupon the tire carcass is subjected to curing temperatures for a predetermined time.

In the reverse operation of the automatic control system for removal of the cured tire from the mold, the air pressure it first released from the internal air bag. Following this the clamping band is then unlocked, whereupon the two halves of the mold can be separated to an open position for removal of the finished tire. All or most of the foregoing operations are preferably performed automatically by the improved electrical control system.

Other features, objects and advantages of the invention will be apparent from the following detailed description of one preferred embodiment thereof. In the accompanying drawings illustrating such embodiment:

FIGURE 1 is an elevational view of the entire machine with the molds closed;

FIGURE 2 is a view at right angles thereto, with the upper mold open;

FIGURE 3 is a fragmentary horizontal sectional view looking down upon the molds in their closed and open positions;

FIGURE 4 is a plan perspective of the assembly of the clamping band and its two power units removed from the remainder of the machine;

FIGURE 5 is a fragmentary side elevational view of the primary and secondary pneumatic power units for operating the clamping band;

FIGURE 6 is a fragmentary plan view of these same two power units which close and open the clamping band;

FIGURE 7 is a fragmentary transverse section of the primary power unit, taken approximately on the plane of the line 7—7 in FIGURE 6;

FIGURE 8 is a perspective view showing the clamping band in open position;

FIGURE 9 is a perspective view showing the clamping band in closed position;

FIGURE 10 is a schematic view showing the left-hand portion of the control mechanism; and FIGURE 11 is a similar view of the right-hand portion of the control mechanism.

Referring first to FIGURES 1 and 2, the upper and lower tire molds M1 and M2 are mounted on a frame F comprising front and rear uprights 20, 20' and 22, 22' joined by horizontal bars 25 and a lower member 26. The vertical uprights 20–22 define a supporting bed 28 for mounting the tire molds M1 and M2. As shown in FIGURE 2, the two rear uprights 22, 22' may continue upwardly above the bed 28 at a slight forward inclination and join with the outer ends of a transverse overhead I beam 31 to form an overhead support. Also supporting the outer ends of this transverse I beam are two vertical uprights 32 extending upwardly from the center of the frame bed 28. Secured to the underside of the I beam is a bifurcated pivot bracket 36 carrying a pivot pin 38 to which is pivoted a supporting lug 40 rising from the upper end of a lifting cylinder 42, which is suspended for limited to and fro motion.

Operating within this lift cylinder is a piston connected to a piston rod 46 extending down for pivotal attachment at 48 to the outer upper edge of the upwardly swinging upper mold section M1. In closed position, this upper mold M1 closes down over the top of the lower mold section M2, which seats on the horizontal frame bed 28. The two mold sections are then locked together by my improved clamping band and power operating mechanism, as will be presently described.

The hinged mounting of the upper mold section M1 is effected at the rear on a horizontal hinge pin 52. The upper leaf 54 of the hinge is secured to the upper mold section through an angle bracket 56, and the lower leaf 58 of the hinge is secured to a bracket fastened to the lower mold section M2.

When the upper mold section is swung into the upwardly inclined position shown in FIGURE 2 by the operation of the pneumatic cylinder 42, the completely cured tire can be removed from the mold, and an uncured tire carcass can then be substituted in the mold for a repetition of the cycle.

In the foregoing method of forming and curing tires between the two halves of a heated mold, the uncured tire carcass together with the internal air bag are first inserted into the upper and lower tire molds, which are then locked together by my improved clamping band. Thereupon relatively high air pressures are introduced within this air bag for forcing the tire carcass outwardly against the tread forming inner walls of the two mold sections. The introduction of these high air pressures into the bag is one of the reasons why my improved clamping band must be positive and certain in its operation of securing the two halves of the heated mold together.

An electrically operating automatic control system first controls the closing of the two mold sections after the tire carcass and the air bag have been inserted therebetween. The control system thereupon closes and locks the clamping band to securely lock the two mold sections together, whereupon the air pressure is introduced into the air bag. The tire carcass is then subjected to curing temperatures for a predetermined time. In the reverse operation of the automatic control system, the air pressure is released from the internal air bag. Following this the clamping band is then unlocked and the inflatable air bag 60 is removed from the completed tire carcass to be then inserted into the next carcass to be cured in the molds.

Following the insertion of the air bag into this next carcass, the operator then activates an automatic timing device which results in the performance of an automatic series of steps for curing the new carcass. The upper and lower mold sections each function to form one half of the complete tire carcass, and are formed interiorly with mating sections of whatever tire pattern is desired in the new tire tread.

The peripheral lower rim of the upper mold M1 is formed with an outwardly projecting upper clamping rim flange 61, and the peripheral upper rim of the lower mold M2 is formed with a similar outwardly projecting lower clamping rim flange 63 (FIG. 7). The clamping band 65 is adapted to fit over both of these clamping rim flanges 61 and 63 as shown in FIG. 7.

As will be seen from the perspective view of the clamping band 65 shown in FIGURE 4, the band is illustrated as being made up of three sections or segments, viz., a back section 66, a right-hand section 67, and a left-hand section 68, although if desired the band may consist of a greater or lesser number of segments. As shown in FIGURE 7, each section or segment is of channel shaped form consisting of an outer web portion 70, from the upper and lower edges of which inwardly projecting upper and lower clamping flanges 71 and 72 extend. In the clamping position, the upper clamping flanges 71 of all three band segments fit over the upper clamping rim flange 61 of the upper mold section M1; and correspondingly the similar lower clamping flanges 72 of all three band segments fit over the lower clamping rim 63 of the lower mold section M2. As best shown in FIGURE 7, the upper and lower clamping flanges 71 and 72 of the clamping band have outwardly divergent angles of flare to exert a contracting wedging action on the rim flanges 61 and 63 as the clamping band is contracted.

Referring to FIGURE 3, the back section 66 of the band is pivotally connected to the adjacent end of the right-hand section 67 by a pivot assembly 76 comprising a pivot lug 77 welded to the back segment 66, and also comprising a cooperating pivot lug 78 welded to the adjacent end of the right-hand section 67, these two pivot lugs 77 and 78 being pivotally connected by a transverse pivot pin 81. Referring now to the other end of the right-hand section 67, this is pivotally connected to the adjacent end of the left-hand section 68 by a similar pivot assembly 84. This is made up of similar pivot lugs 77' and 78' welded respectively to the left-hand band segment 68 and to the right-hand band segment 67, and pivoted together by the pivot pin 81'. Welded or otherwise secured to the right-hand band segment 67 just above each of the two pivot assemblies 76 and 84, are transverse stop lugs 86 and 87 which are adapted to have outward abutment against stationary stop pins or projections 91 and 92 when the right-hand band segment 67 is in its outward or non-clamping position illustrated in dotted lines in FIGURE 3. These stop pins 91 and 92 have stationary anchorage to the lower bed frame of the supporting structure and assist in holding the clamping band distended in its releasing position.

Welded or otherwise secured to the clamping segment 66, adjacent to its outwardly swinging left end, is a similar stop lug 95 adapted to have abutment against a stop pin 96, and welded to the outwardly swinging end portion of segment 68 is a similar stop lug 98, adapted to have abutment against stop pin 99 when the clamping band is distended into releasing position. These two stop pins 96 and 99 are also anchored to the bed frame. The four stop lugs 86, 87 and 96 and 98 cooperate with their respective stop pins to maintain the clamping band in its approximately centered position with respect to the upper and lower molds when the band is released. The free end 103 of the band segment 66 and the free end 104 of the band segment 68 define therebetween the gap 105 which is decreased or increased as the clamping band closes or opens.

The clamping band 65 is spread outwardly into its open or distended position (indicated in dotted lines in FIGURE 3) by spreading mechanism 110 comprising a spreading cylinder 111 from the right-hand end of which extends a piston rod 114 connected to a piston within the cylinder. At its rear or left-hand end the cylinder has a head 116 from which extends a pivot lug 118 which has pivotal attachment by pivot pin 120 to a pivot bracket 122 projecting rigidly outwardly from the left-hand end portion of the clamping band section 66. At the other end of the spreader assembly the spreader cylinder 111 has a cylinder head 125 through which passes the piston rod 114 bearing a pivot eye 126 connected by pivot pin 128 with a pivot bracket 130 projecting rigidly outwardly from the end portion of the left-hand clamping band section 68. The left- and right-hand pivot pins 120 and 128 extend downwardly a substantial distance to dispose the spreader cylinder 111 in a horizontal plane substantially below the plane of the clamping band 65, so as not to interfere with the upper power cylinder and power linkage to be presently described. Compressed air nipples 134 and 135 in the rear and front cylinder heads 116 and 125 provide for connections with compressed air hoses 136 and 137. As best seen in FIGURE 8 a tension spring 140 is connected between an eye 142 on the pivot block 126 and at the other end on an anchoring pin 143 projecting upwardly from the frame bed 28. This spring tends in the opened position of clamp band 65 to impose a constant tension in a clockwise direction for closing the clamping band. An adjustable threaded stop pin 145 screws through a lug 146 fastened to the bed frame, and affords an adjustable stop to be engaged by the head 116 at the adjacent end of the spreader cylinder. Also the pivot eye 126 is adapted to engage stop plate 149 secured to the frame and which together with the stop pin 145 engaged by head 116 limits the extended positions of cylinder 111 and piston rod 114 in the opened position of clamp band 65.

Reference will now be made to the pneumatic toggle mechanism 150 serving as power multiplying means which closes the clamping band 65 under a high degree of pressure, and locks it in such pressure position. This power mechanism, as best seen in FIGURES 4, 8 and 9, comprises an outwardly extending pneumatic cylinder 152 which is adapted to swing in a horizontal plane above the plane of the spreader cylinder 111. The outer and inner end heads 153 and 154 of this upper cylinder 152, as shown in FIGURE 4 carry nipples 155 and 156 for connection with compressed air hose lines 157 and 158 for admitting compressed air into opposite ends of the cylinder upon opposite sides of the piston reciprocating therein, as will be later described.

The piston rod 160 extending from the inner end of the power cylinder 152 has threaded mounting at its inner end in a pivot clevis 162 which is pivotally connected by pin 164 to a pivot lug 166 projecting outwardly from the outward wall of the left-hand clamping band section 68. Thus, the inward and outward pressures established in the piston rod 160 are transmitted as inward and outward pressures to the adjacent end portion of this clamping band section 68.

Welded or otherwise secured to the inner cylinder head 156, 154 are upper and lower parallel yoke arms 169 which carry vertically aligned pivot pins 171 at their inner ends, establishing a vertical axis pivotal or toggle connection $x$—$x$ with a toggle link 174. This toggle link 174 is made up of two vertically spaced duplicate link plates 174' extending horizontally above and below the piston rod 160. At their other ends, these plates complete another toggle or knuckle connection indicated at y—y in FIGURE 5 with the adjacent end of the clamping band section 66. This pivotal axis y—y consists of a pivot pin 176 passing through the spaced link plates 174' and through an intervening pivot lug 178 projecting outwardly from the end of the clamping band section 66. The spaced link plates 174' can also be considered as a handle side plate of the toggle assembly. The swinging ends of these link plates 174' can be arranged to operate, see a limit switch 251 when the clamp is closed.

The other link element of this toggle assembly 150 comprises a threaded adjustable link 181 having its inner pivot end 182 connected by a vertical pivot pin 184 defining a toggle or knuckle connection z—z passing downwardly through the pivot end 182 and through the spaced arms of an outwardly projecting bifurcated pivot lug 186, welded or otherwise secured to the adjacent end of the clamping band section 68.

This toggle link 181 can swing back and forth through the space between the spaced link plates 174' of the first toggle link 174. Such second toggle link 181 has a cam shank portion provided with a thread 183 extending to its outer end. This threaded shank cam portion 182 screws outwardly through a threaded hole 187 extending transversely through a toggle hub or knuckle 188. This toggle hub 188 has upwardly and downwardly projecting pivot pins 190 defining a toggle axis w—w pivotally seated in vertically aligned pivot holes 192 in the spaced plates of the first toggle link 174.

Referring now to FIGURE 4, this shows the toggle assembly in the open position which it assumes when the clamping band is in its distended or open position. It will be observed that in this position the clamp band open cylinder 152 is in a laterally projecting distended position with the piston rod 160 extended toward the right forwardly out of the front end of the cylinder 152. This establishes the maximum spaced distance between the toggle pivot z defined by the axis of the pivot pin 184 and toggle pivot y so that the clamping band is opened up to its maximum circumference for permitting the top mold section M1 to be swung upwardly to its elevated position by the lifting cylinder (FIG. 2) for ready withdrawal of the cured tire carcass.

It will be noted in the closed position of the clamp band 65, as best seen in FIGURE 9, that the axis z—z defined by pin 184 has passed over center to a position radially outwardly of the axis y—y defined by pin 176 and the axis w—w defined by pin 190 to lock up the toggle to assure maintaining the clamp 65 in position locking the separable tire molds in closed position under the multiplying power afforded by the toggle. As further shown in FIGURE 9 the axis z—z defined by pin 184 lies outwardly of a straight line a—a extending horizontally through the axes y—y and w—w so that the toggle mechanism is in locked up condition.

The automatic control apparatus, designated 200 in its entirety, comprises a series of circularly arranged contacts 202 and a contacting arm 204 adapted to make contact therewith in their relative rotary motion, the rotary motion preferably being imparted to the contacting arm 204.

A series of solenoid valves 206 to 216 inclusive are electrically connected to be responsive to contact being established between the contacting arm 204 and the contacts 202 of the circular series. In the cyclical sequence, the solenoid valve 206 is first actuated to admit compressed air through a hose 220 to the upper end of lifting cylinder 42 for closing the upper mold M1 down over the lower mold M2, with the tire and the air bag therein.

Thereupon, the solenoid valve 208 is energized for admitting compressed air through hose 222 to a manifold 224 from which extend the hoses 137 and 158 leading to the clamp band open cylinder 152 and to the clamp band spread cylinder 110 for closing the clamping band 65 tightly over the clamping flanges 61 and 63 of the two tire molds M1 and M2.

Following this the solenoid valve 210 is actuated by the next step in the timer sequence for admitting compressed air through the hose 228 to the inlet stem of the air bag 60 for inflating the air bag to press the tire carcass outwardly against the patterned inner walls of the tire mold. These tire molds are heated to cure the carcass and this curing operation is continued until the carcass has been cured to the desired degree. The duration of the curing operation can be manually determined, or can be automatically determined by the timer 200. Any suitable means may be employed for preventing the air bag 60 from expanding inwardly and upwardly through the tire carcass opening, and through the central openings in the tire molds.

At the termination of the curing operation, the solenoid valve 212 is energized by the timer, which results in the deflation of the air bag 60 through the hoses 228 and the pressure switch 230, or in any other preferred manner.

Upon the deflation of the air bag 60, the tire molds can be separated, which is effected by the timer operation of the solenoid valve 214. This admits compressed air through hose 236 to the manifold 238, which connects with hoses 136 and 157 leading to the back end of cylinder 111, and to the outer end of cylinder 152. The resulting energization of both of the cylinders in a piston inward direction unlocks the toggle joint of the clamping band 65 and opens the band to the point where the upper tire mold M1 can be separated from the lower tire mold M2.

The timer energizes the solenoid valve 216 for admitting compressed air through hose 240 to the lifting cylinder 42, which swings the upper mold M2 upwardly to the open position shown in FIGURE 2. This permits the removal of the cured tire carcass, thereby completing the cycle.

Referring to certain limit switches, there is a switch 251 which is adapted to be operated by the right-hand end of the toggle link 174 when the mold is closed. There is also a limit switch 254 at the right-hand side of the assembly which operates when the mold opens. There is also a switch 256 located near the pivot 48 at the upper mold when the mold is closed.

At the left-hand side of the assembly there is a start and stop electric timer 260 which operates a solenoid valve 262 which deflates the air tube 60. Beyond this deflate valve is a pressure switch 264, which branches to solenoid valve 266 which controls the air cylinders that operate the clamping band; and also branches to the air bag to deflate. The electric timer also controls a solenoid valve 270 which controls the air line 220 to the top end of the lifting cylinder 42. The lower end of the lifting cylinder 42 receives air through hose 240 under control of the solenoid 277.

While I have described the invention in a preferred form, I do not intend to be limited to that form, except insofar as the appended claims are so limited, since various modifications within the scope of the present invention will readily occur to those skilled in the art, particularly with my disclosure before them.

I claim:
1. In a tire forming apparatus, the combination of two relatively separable tire molds adapted to receive a tire carcass therein, a clamping band adapted to clamp the two tire molds together, power means for contracting the clamping band comprising, a first cylinder and piston power unit having its cylinder connecting with one end of said clamping band and having its piston connecting with the other end of said clamping band for exerting opening and closing forces on said clamping band, power multiplying means connecting said power means with said clamping band for increasing the contracting force exerted on said clamping band comprising, a second cylinder and piston power unit for exerting closing forces on said clamping band, and toggle linkage connecting said second power unit with the end portions of said clamping band for exerting amplified closing forces on said band and for locking said clamping band in its closed position.

2. In a tire forming apparatus, the combination of two relatively separable tire molds adapted to receive a tire carcass therein, a clamping band adapted to clamp the two tire molds together, power means for contracting the clamping band, power multiplying means connecting said power means with said clamping band for increasing the contracting force exerted on said clamping band, wherein said power multiplying means includes a first toggle link, a first pivot pivotally connecting said first toggle link to one end of said clamping band, a second toggle link, a second pivot pivotally connecting said second toggle link to the other end of said clamping band, a toggle pivot pivotally connecting said first toggle link to said second toggle link, and wherein said power multiplying means swings said two toggle links for opening and closing said clamping band.

3. In a tire forming apparatus, the combination of two relatively separable tire molds adapted to receive a tire carcass therein, a clamping band adapted to clamp the two tire molds together, power means for contracting the clamping band, power multiplying means connecting said power means with said clamping band for increasing the contracting force exerted on said clamping band, wherein the clamping band has two ends terminating in a separable gap, handle means having one end pivotally connected to one end of said band adjacent said gap, said power multiplying means comprising a fluid pressure locking cylinder having a piston and piston rod, means pivotally connecting said piston rod with the other end of said clamping band, means pivotally connecting the adjacent end of said locking cylinder with the outwardly swinging end of said handle means, a closed cam link having threaded end means pivotally connecting the other end of said cam link to said clamping band, a threaded adjusting block pivotally mounted on said handle means and having a transverse threaded bore through which the threaded end of said cam link screws, said power means comprising a pneumatic spread cylinder and piston, means pivotally connecting said spread cylinder with one end portion of said clamping band and means pivotally connecting said spread cylinder piston with the other end portion of said clamping band.

References Cited

UNITED STATES PATENTS

| | | |
|---|---|---|
| 2,736,060 | 2/1956 | Glynn. |
| 2,806,251 | 9/1957 | McDonald. |
| 2,812,547 | 11/1957 | Duerksen et al. |
| 2,981,977 | 5/1961 | Fannen _____ 18—43 |
| 3,042,966 | 7/1962 | Laycox. |
| 3,074,109 | 1/1963 | Duerksen. |
| 3,091,802 | 6/1963 | Rawls. |
| 3,135,997 | 6/1964 | Smyser. |
| 3,293,698 | 12/1966 | Bavers _____ 18—43 |

J. HOWARD FLINT, JR., Primary Examiner

U.S. Cl. X.R.

18—2, 18